E. SIEGEL.
SHOCK ABSORBER FOR VEHICLES.
APPLICATION FILED OCT. 12, 1917.
1,264,694.
Patented Apr. 30, 1918.
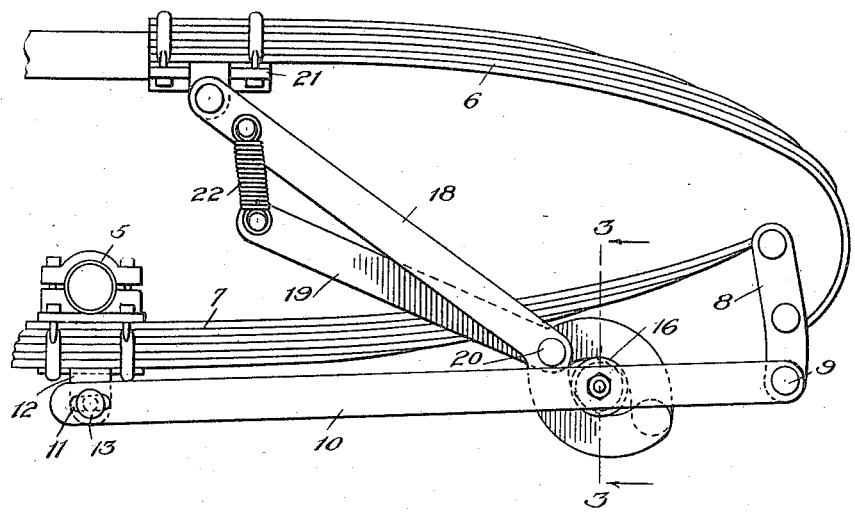
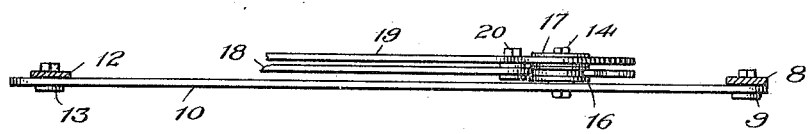
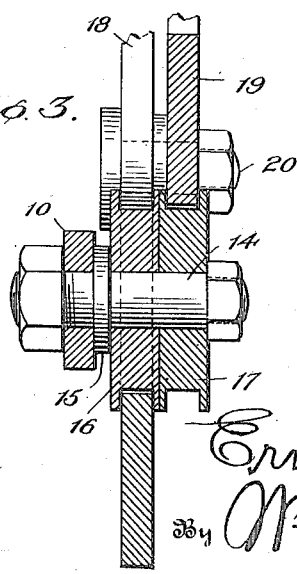
Witness
Edwin L. Bradford
Inventor
Ernest Siegel,
By Wm E. Dyre
Attorney

UNITED STATES PATENT OFFICE.

ERNEST SIEGEL, OF NEW YORK, N. Y.

SHOCK-ABSORBER FOR VEHICLES.

1,264,694.           Specification of Letters Patent.      Patented Apr. 30, 1918.

Application filed October 12, 1917. Serial No. 196,258.

*To all whom it may concern:*

Be it known that I, ERNEST SIEGEL, a citizen of the United States, residing at New York, in the county of New York and State of New York, have invented certain new and useful Improvements in Shock-Absorbers for Vehicles; and I do hereby declare the following to be a full, clear, and exact description of the invention, such as will enable others skilled in the art to which it appertains to make and use the same.

My invention broadly stated relates to automobiles, carriages, wagons and spring vehicles generally, but more particularly to spring equipment of novel construction for use in connection with such vehicles.

It has for an object the production of novel and efficient means for lessening or absorbing the shock to which vehicles, and occupants of vehicles, are constantly subjected by reason of road obstructions and inequalities.

For a further object my invention is designed and adapted to relieve the undue and severe strains to which the running gear of vehicles, and vehicles themselves are constantly subjected while in service, and particularly heavy, or fast-moving motor cars.

With these and other objects and advantages in view, the present invention will be hereinafter particularly set forth and then pointed out in the appended claims.

In the accompanying drawings which form part of this application for Letters Patent, and whereon corresponding numerals indicate like parts in the several views:

Figure 1 is a fragmentary view of one set of vehicle springs having my improved shock-absorbing equipment attached thereto.

Fig. 2 is a top plan view of the said equipment itself detached, and

Fig. 3 is a transverse sectional view through the shock-absorber on the line 3—3 of Fig. 1, looking in the direction of the arrows.

Reference being had to the drawings and numerals thereon, 5 indicates a suitable bearing for a vehicle axle, and 6, 7 upper and lower body springs respectively pivotally connected at their outer ends as usual by a shackle 8, which in this instance, however, depends slightly below the end of the spring section 7, as best shown by Fig. 1.

Pivotally connected as at 9 to the lower end of shackle 8 is a horizontal bar 10 which preferably extends to a median position beneath the spring section 7, and at that end is provided with an elongated opening or slot 11. At approximately this point also a bracket 12, clipped beneath the spring 7, carries a bolt which passes through slot 11 and is fitted with a retaining washer 13 by means of which one end of the floating bar 10 aforesaid is slidably supported.

Rigidly bolted to the said floating bar 10 near one end is an inwardly projecting stud or stub shaft 14 provided with a spacing flange 15 and suitable nuts screw threaded upon both ends as best shown by Fig. 3 of the drawings.

Upon this stub shaft 14 inside of the bar 10 are rotatably mounted two adjacent flanged rollers or wheels 16 and 17 in adjacent vertical planes, and resting in the grooves of these rollers 16 and 17 are the curved lower ends of a pair of friction levers 18 and 19, respectively, which are pivotally connected, are crossed as at 20 and extend in an upwardly direction at one side of the spring sections 6 and 7.

By preference the said levers 18 and 19 are of unequal length, the longer lever 18 being pivotally connected at its upper end to the spring 6 by means of an ordinary saddle clip 21, the other and shorter of said levers 19 being connected at its upper end to the lever 18 by means of a contractile spring 22, as shown by Fig. 1.

The foregoing being a description of my invention in one form of embodiment, it should be understood that various structural changes and modified arrangements of its several parts may be made and substituted for those herein shown and described, without in the least departing from the spirit of this invention, the operation of which may now be briefly set forth as follows:

Presuming the structure to be substantially as shown by the drawings, and presuming also that an unusual shock is sustained by the running gear of a vehicle equipped with my improvements, as for example when the wheels (not shown) drop into a road depression or rut; under these conditions all parts shown by Fig. 1 will descend bodily until suddenly arrested by the bottom of said depression, whereupon the uppermost spring section 6 will be still further depressed by weight of the vehicle body which it partially supports. During this relative movement of the spring sections 6 and 7, the levers 18 and 19 are collectively rotated upon their respective rollers 16 and 17, the bar 10 being at the same time slightly reciprocated, this reciprocation being permitted by reason of its slotted connection with the pin 13. When, however, the rebound of spring section 6 occurs the shackle 8 is rocked in the reverse direction, bar 10 is again reciprocated, and the upper curved end of lever 19 being momentarily restrained by engagement with the upper side of roller 17 causes the contractile spring 22 to be placed under tension as the lever 18 is carried upward by reason of its connection with the spring section 6; and the influence of these springs 22, of which there is one or more for each set of vehicle springs, is greatly increased because of the leverage at which they operate to absorb shocks which otherwise would of necessity be imparted directly and with full force to the running gear and body of the vehicle itself.

Having thus described my present invention, what I now claim and desire to secure by Letters Patent is:

1. In a shock absorber the combination with a vehicle frame and suitable supporting springs, of a floating bar carried below each set of springs, a projection upon said bar, and a pair of crossed levers fulcrumed upon each other and adapted to bear upon opposite sides of the said projection, a contractile spring connecting the upper portions of said levers, and a clip for securing one of said levers to the uppermost of the vehicle spring members.

2. In a shock absorber the combination with a vehicle frame and suitable supporting springs, of shackles for connecting the ends of said springs having a downward extension, a floating bar pivotally connected to the said downward extension and at its opposite end reciprocally supported beneath each set of springs, a projection upon one side of said bar, and a pair of crossed levers fulcrumed upon each other and adapted to bear upon opposite sides of said projection, a contractile spring connecting the upper portions of said levers, and a clip for securing one of said levers to the uppermost of the vehicle spring members.

3. In a shock absorber the combination with a vehicle frame and suitable supporting springs, of shackles for connecting the ends of said springs having a downward extension, a floating bar pivotally connected to the said downward extension and at its opposite end reciprocally supported beneath each set of springs, a pair of friction rollers carried by said floating bar, and a pair of crossed levers fulcrumed upon each other and adapted to bear upon opposite sides of their respective rollers aforesaid, a contractile spring connecting the upper portions of said levers, and means for pivotally securing one of said levers to the uppermost of the vehicle spring members.

In testimony whereof I affix my signature, in presence of two subscribing witnesses.

ERNEST SIEGEL.

Witnesses:
HERBERT K. WAIT,
HENRY J. PERRIN.